US006628762B1

United States Patent
Ahrndt et al.

(12) United States Patent
(10) Patent No.: US 6,628,762 B1
(45) Date of Patent: Sep. 30, 2003

(54) METHOD FOR THE TRANSMISSION OF A HIGH-BIT-RATE DIGITAL SIGNAL

(75) Inventors: Thomas Ahrndt, Munich (DE); Robert Herbert Beeman, Coral Springs, FL (US)

(73) Assignee: Siemens Aktiengesellschaft, Munich (DE)

( * ) Notice: Subject to any disclaimer, the term of this patent is extended or adjusted under 35 U.S.C. 154(b) by 253 days.

(21) Appl. No.: 09/669,003

(22) Filed: Sep. 25, 2000

(30) Foreign Application Priority Data

Sep. 30, 1999 (DE) .......................... 199 47 114

(51) Int. Cl.[7] .......................................... H04M 11/00
(52) U.S. Cl. ................. 379/90.01; 379/93.05; 379/93.09
(58) Field of Search ................. 379/90.01, 93.01, 379/93.02, 93.03, 93.04, 93.05, 93.09, 93.21, 93.28, 93.37, 110.01; 375/222, 219; 370/465, 468, 494, 495

(56) References Cited

U.S. PATENT DOCUMENTS 5,784,377 A * 7/1998 Baydar et al. ........... 379/90.01
6,269,154 B1 * 7/2001 Chellali et al. .......... 379/93.28
6,324,212 B1 * 11/2001 Jenness ....................... 375/222

* cited by examiner

Primary Examiner—Melur Ramakrishnaiah
(74) Attorney, Agent, or Firm—Shaw Pittman LLP

(57) ABSTRACT

In order to prevent occurrence of an interruption of a transmission of a high-bit-rate digital signal due to specific signals during simultaneous transmission of the high-bit-rate digital signal and of signals of a standard telephone connection between a public exchange and a subscriber-side terminal, an information signal is output before the occurrence of such a special situation and, as a result of the information signal, the transmission of the high-bit-rate digital signal is modified in a suitable way for the duration of the special situation.

19 Claims, 2 Drawing Sheets

METHOD FOR THE TRANSMISSION OF A HIGH-BIT-RATE DIGITAL SIGNAL

BACKGROUND OF THE INVENTION

The present invention is directed to a method for the transmission of a high-bit-rate digital signal.

Subscriber line modules—also called line cards—of the new generation offer the possibility of transmitting digital signals at high speed with the assistance of innovative transmission methods. This is achieved in that the assemblies can transmit or receive in a significantly greater frequency range than was previously employed for the analog audio signals. Given an ADSL (asymmetrical digital subscriber line), the digital signals are transmitted, for example, in a frequency range of approximately 30 kHz through 1.1 MHz. Transmission rates of up to 8.192 Mbit per second can thereby be achieved, so that such transmission methods could also be employed by call service (for example, video on demand). ADSL, but also UDSL (universal digital subscriber line) as well, thereby offer the possibility of also transmitting the signals of a standard telephone connection (plain old telephone service, POTS) or, respectively, of an ISDN terminal in a base frequency band on the same line parallel to the high-bit-rate digital signal.

In the simultaneous transmission of the signals of the standard telephone connection and of the high-bit-rate digital signal, however, special situations can occur wherein the high-bit-rate data traffic is deteriorated by signals of the voice band. Such a special situation can occur, for example, in the transmission of ringing signals or of meter pulses. For the transmission of a symmetrical ringing signal, audio frequencies at the level of 20 or 25 Hz that are offset in phase by 180° are transmitted on each of the two leads of the two-lead connecting cable, namely with a voltage of more than 100 V. In the case of an asymmetrical ringing signal, a sine signal is transmitted with 20 or 25 Hz on one of the two leads, whereas the other lead is grounded. In both instances, however, the level of the transmitted ringing signal is higher than 100 V. In the transmission of meter pulses, sine frequencies with 12 or 16 kHz are transmitted, for example, on both leads, whereby these sine signal on the two leads are phase-offset by 180° and the voltages amount to about 5 Volts.

Due to the transmission of such special signals—particularly of the ringing signals with their higher voltages—, there is the risk that the phase synchronization between the subscriber line module and a modem of the subscriber side that receives the digital signal will be disturbed or even lost. This then leads either to a noticeable increase in the bit error rate for the duration of this special situation or, on the other hand, also leads to a complete abort of the connection. In this case, the data traffic then only resumes after a renewed, complete connection setup, which lasts approximately 10 seconds.

SUMMARY OF THE INVENTION

It is therefore an object of the present invention to specify a method for the transmission of a high-bit-rate digital signal between the subscriber line module of a public switching center and a modem of the subscriber side, whereby the signals of an analog standard telephone connection can also be transmitted over the same telecommunication line parallel to the digital signal, and whereby the quality of the data connection is enhanced.

According to the method of the invention for transmission of a high-bit-rate digital signal between a subscriber line module of a public exchange and a modem of a subscriber side via a telecommunications line, signals of an analog standard telephone connection are transmitted parallel to the high-bit-rate digital signal. Before occurrence of a special situation that influences the transmission of the high-bit-rate digital signal, with the subscriber line module or the subscriber-side modem outputting an information signal. The transmission of the high-bit-rate signal is modified for a duration of the special situation due to the information signal. This inventive method is characterized in that, before the occurrence of a special situation, i.e., for example, before the transmission of a ringing signal or of a meter pulse, the subscriber line module or the subscriber-side modem—dependent on the line end from which the signal influencing the transmission of the high-bit-rate digital signal is supplied—outputs an information signal, and the transmission of the digital signal is modified in a suitable way for the duration of the special situation on the basis of this information signal. This means that both devices that are responsible for the sending and receiving of the digital signal are set to a problematical data transmission during this time and, for example, activate correction possibilities or specific filters. The transmission rate of the digital signal can then in fact still drop slightly, but a complete connection abort and a subsequent, complete connection setup procedure can be avoided in any case or at least is clearly shortened, so that the quality of the data connection clearly increases.

The information signal is output by that device from whose end the infeed of the signal that is problematical for the high-bit-rate transmission occurs, since this device can already be informed in advance about the occurrence of the special situation. As a rule, thus the infeed of the information signal occurs proceeding from the exchange side. However, it would be conceivable that the modem of the subscriber side is likewise connected to the telephone of the subscriber side and is informed when the setup of the telecommunication connection occurs proceeding from the subscriber side, so that the information signal can also be output proceeding from the subscriber side.

The information signal can assume the greatest variety of forms. When, for example, the transmission of the high-bit-rate signal ensues according to the ADSL method, then a number of possibilities are available. The International Telecommunication Union ITU is currently deliberating the passage of a new standard (G.992.1) for the transmission of signals according to the ADSL method. A similar standard has already been passed by the American National Standards Institute ANSI (T1.413). The European standard of the ITU defines a number of possibilities for exchanging messages between the modem of the exchange side—i.e. the line card or the assembly—and the modem of the subscriber side. These possibilities offer several degrees of freedom for defining new messages. In the ADSL method, for example, the transmission of the data thus occurs within what are referred to as super frames wherein a plurality of what are referred to as indicator bits (IB) are respectively provided, these containing information about the status of the devices participating in the data traffic. An employment has thereby not yet been provided for some of these indicator bits, so that these can be employed, for example, for the implementation of the inventive method. Currently, the first seven indicator bits are not yet occupied, so that an indication could be provided, for instance by setting the indicator bit 0, that a ringing signal is about to be forwarded onto the line or that a ringing signal is being transmitted at the moment.

Furthermore, the transmission of EOC (embedded operation channel) messages with which specific functions can be activated is provided in the framework of the data exchange according to the ADSL method. Here, too, functions have not yet been assigned to a number of EOC messages (for example, the codes 15, 16 or 80), so that these are also available for the transmission of the inventive information signal. The third possibility is comprised in defining new AOC (ADSL overhead control channel) messages that likewise indicate the occurrence of a special situation.

The three possibilities that have just been described refer specifically to the data transmission according to the ADSL method. Both in this method as well as in the UDSL method, the frequency range in which the transmission of the digital signal ensues is divided into a plurality of sub-channels. This is referred to as DMT method (discrete multi-tone). The subdivision of the frequency range is thereby regulated by specific DMT parameters. These parameters also offer the possibility of employing them for the transmission of the information signal. For example, the phase or the amplitude of a pilot tone that is responsible for the time-synchronization of the two data transmission and reception devices could be modified for this purpose. In the same way, a further synchronization symbol (sync symbol) that characterizes the recognition of the start and the end of a data packet could also be modified. Furthermore, certain control signals (cyclic prefix) precede every data block. These, too, could be modified in a suitable way for indicating a special situation.

A further possibility is comprised in informing the opposite terminal device of the information about the occurrence of a special situation within the framework of the payload data transmitted in the transmission method. However, the information signal could also be formed by a new audio signal whose frequency lies outside the frequency range employed for the transmission of the digital signal. This audio signal could then be correspondingly modulated in order to indicate the special situation.

The invention shall be explained below on the basis of the attached drawings.

DESCRIPTION OF THE PREFERRED EMBODIMENTS

Figure 1:
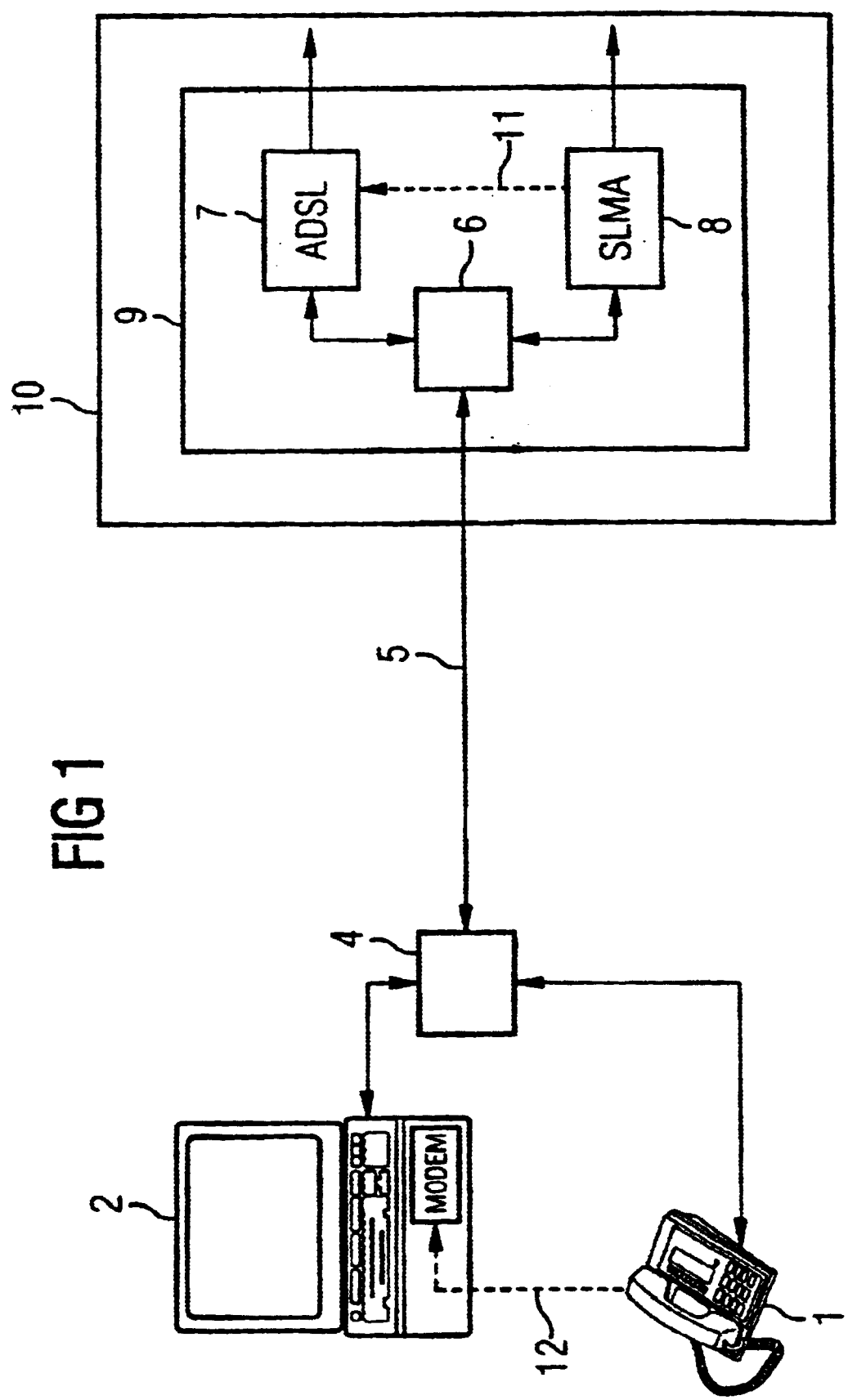
FIG. 1 shows the connection between a subscriber line and a public exchange.

The subscriber-side terminal comprises a standard telephone 1 as well as a computer 2 that contains a modem 3 that is in the position to receive or send data according to the ADSL method. Via a copper double-lead 5, this subscriber-side terminal is connected to a subscriber line module (line card) 9 that is installed in a public exchange 10. The subscriber line module 9 contains an SLMA (subscriber line module analog) module 8 as well as an ADSL module 7. The SLMA module 8 transmits or receives analog or digital data for telephony in a frequency baseband. Fundamentally, the ADSL module 7 is likewise a matter of a modem that is in the position of receiving respective sending high-bit-rate digital signals according to the ADSL method.

Figure 2:
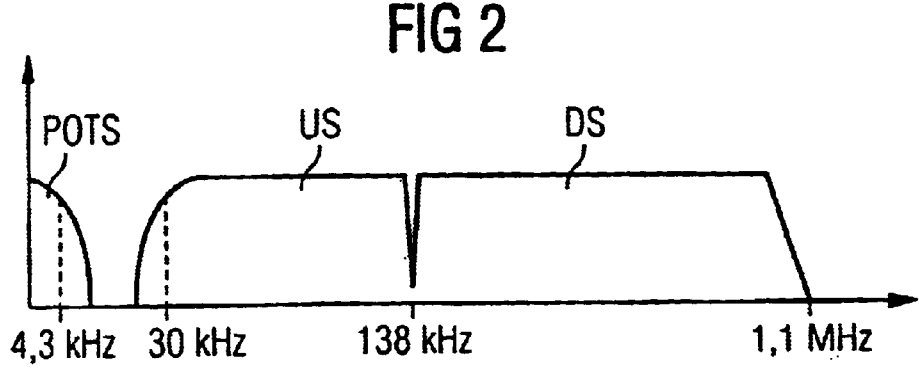
FIG. 2 shows the basic structure of a frequency band for the data transmission according to the ADSL method via POTS given a grouped frequency.
Figure 3:
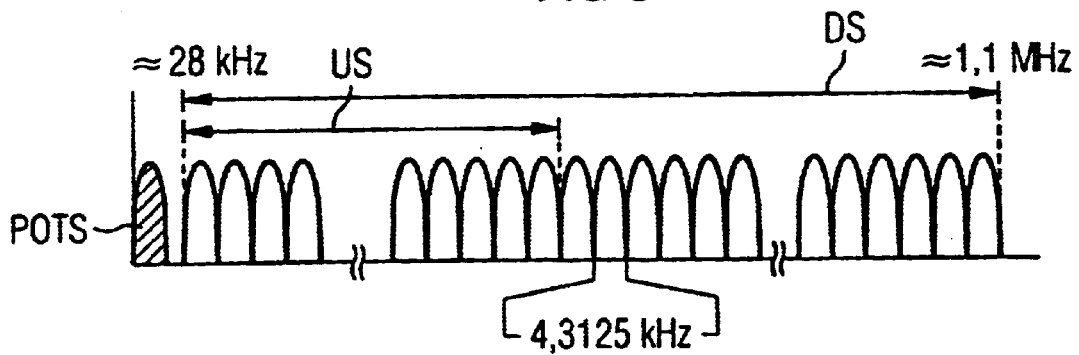
FIG. 3 shows the fundamental structure of the frequency band for the data transmission according to the ADSL method via POTS given an echo compensation.

According to the illustration of the schematic structure of the frequency band in FIG. 2, the telephone 1 and the SLMA module 8 exchange their data in a baseband POTS at approximately 0–4 kHz. For the common transport via the same line 5, the high-bit-rate digital signals are converted into frequency bands above the traditional voice band. Given, for example, grouped frequency operation, the range from 30 kHz through 138 kHz is provided for the data transmission from the subscriber terminal to the switching center 10 (upstream) US, and the range from 138 kHz through 1.1 MHz is provided for the signal transmission to the subscriber terminal (downstream) DS. These two frequency ranges are in turn subdivided into a plurality of frequency bands having a width of 4.3125 kHz, as is more clearly presented in FIG. 3. However, echo compensation is also additionally employed in the method shown in FIG. 3, so that the lower frequency bands UF can be employed for the transmission in the direction to the subscriber terminal, since the echo signal back to the public switching center or to the subscriber terminal now no longer has any noteworthy disturbing influence. The separation of the telephone signals from the high-bit-rate digital signals then respectively occurs at the end of the transmission line 5 with frequency splitters (POTS or ISDN splitters) 4 and 6 that respectively conduct the frequency parts above the baseband POTS to the PC 2 or the ADSL module 7.

In contrast to the ADSL method shown here, no POTS or ISDN splitters are provided given the UDSL method. In order to nonetheless prevent the telephone 1 from being excessively burdened by the high-frequency signals, this can then be preceded by a low-pass filter.

The further connections of the ADSL and of the SLMA module to the Internet or to the telephone network are merely schematically shown in the public exchange 10.

Let it now be assumed that the ADSL module 7 and the modem 3 of the computer 2 exchange high-bit-rate digital signals. When the setup of a telecommunication connection to the telephone 1 from an arbitrary, further telecommunications apparatus occurs during this time, then the telecommunications connection is set up via the telephone network up to the public exchange 10 of the subscriber terminal. Before, however, the ringing tone also is forwarded from the SLMA module 8 onto the telecommunications line 5 in addition to the high-bit-rate digital signal, the ADSL module 7 is informed thereof by a suitable signal via a connecting line 11. Even before the ringing tone is then in fact output onto the line 5, the ADSL module 7 inventively transmits the above-described information signal to the modem 3. Both the modem 3 as well as the ADSL module 7 then adapt their data transmission behavior to this special situation for the duration of the transmission of the ringing tone, which means, for example, that an enhanced error correction is activated. However, specific filters preceding the ADSL module 7 and the modem 3 could also be activated. When the transmission of the ringing tone has ended, the transmission of the high-bit-rate digital signal again occurs as usual. In the same way, the modem 3 and the ADSL module 7 can modify their transmission behavior when the public exchange 10 respectively transmits a meter pulse to the telephone 1.

A connection 12 between the telephone 1 and the modem 3 can likewise be provided at the subscriber-side connection. When, namely, the modem 3 and the ADSL module 7 are exchanging data while a number for a telephone call is being dialed at the telephone 1, then it can also be inventively provided here that the modem 3 informs the ADSL unit 7 thereof even before the telephone 1 forwards the corresponding dial pulses onto the line 5.

The occurrence of an interruption in the data transmission between the modem 3 and the ADSL unit 7, which subsequently requires another time-consuming and costly connection setup procedure, due to the appearance of this special situation can thus be avoided.

Furthermore, the inventive method can also be very simply realized, particularly when the free possibility remaining in the ADSL standard yet to be passed is employed for the definition of the information signal, since only software-related adaptations in the ADSL module 7 and the modem 3 then need be implemented.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A method for transmission of a high-bit-rate digital signal between a subscriber line module of a public exchange and a modem of a subscriber side via a telecommunications line, comprising the steps of:
   transmitting signals of an analog standard telephone connection parallel to the high-bit-rate digital signal;
   detecting an indication of a special situation that deteriorates quality of the transmission of the high-bit-rate digital signal and outputting an information signal from the subscriber line module or the subscriber-side modem before an occurrence of the special situation is transmitted between the subscriber line module and the subscriber-side modem; and
   modifying transmission of the high-bit-rate signal in response to said information signal for a duration of the special situation to compensate for a deteriorated quality of transmission of the high-bit-rate digital signal.

2. The method according to claim 1 wherein the special situation is a transmission of a ringing signal.

3. The method according to claim 1 wherein the special situation is a transmission of a meter pulse.

4. The method according to claim 1 wherein the transmission of the high-bit-rate digital signal occurs according to a USDL method.

5. The method according to claim 1 wherein the transmission of the high-bit-rate digital signal occurs according to an ADSL method.

6. The method according to claim 5 wherein the information signal is formed by setting an indicator bit.

7. The method according to claim 5 wherein the information signal is formed by an EOC command corresponding to the ADSL method.

8. The method according to claim 5 wherein the information signal is formed by an AOC signal corresponding to the ADSL method.

9. The method according to claim 1 wherein the information signal is formed by modification of phase or amplitude of a pilot tone.

10. The method according to claim 1 wherein the information signal is formed by modifying a synchronization signal.

11. The method according to claim 1 wherein the information signal is formed by modifying a control value for a following data block.

12. The method according to claim 1 wherein the information signal is transmitted by the high-bit-rate payload data.

13. The method according to claim 1 wherein the information signal is formed by an audio signal whose frequency lies outside a frequency range employed for the transmission of the digital signal.

14. A method for transmission of a high-bit-rate digital signal between a subscriber line module of a public exchange and a modem of a subscriber side via a telecommunications line, comprising the steps of:
   transmitting signals of an analog telephone connection parallel to the high-bit-rate digital signal;
   detecting an indication of a special situation that deteriorates a quality of the transmission of the high-bit-rate digital signal and transmitting an information signal between the subscriber line module and the subscriber-side modem before an occurrence of the special situation is transmitted between the subscriber line module and the subscriber-side modem; and
   modifying transmission of the high-bit-rate signal in response to said information signal to lessen effects from the special situation for a duration of the special situation.

15. A method for transmitting a high-bit-rate digital signal via a telecommunications line between a digital subscriber line module and a subscriber modem, wherein telephone signals are transmitted in parallel with the high-bit-rate digital signal over the telecommunications line, comprising the steps of:
   detecting an indication of an occurrence of a temporary telephone signaling that causes a deterioration in quality of the transmission of the high-bit-rate digital signal during the occurrence of the temporary telephone signaling;
   transmitting an information signal between the digital subscriber line module and the subscriber modem to indicate the occurrence of the temporary telephone signaling; and
   adapting transmission of the high-bit-rate digital signal by activating enhanced error correction during the occurrence of the temporary telephone signaling to reduce deterioration in quality of the transmission.

16. The method of claim 15, wherein transmission is adapted by activating enhanced error correction.

17. The method of claim 15, wherein transmission is adapted by activating a filter preceding the digital subscriber line module or the subscriber modem.

18. The method of claim 15, wherein the indication of an occurrence of the temporary telephone signaling is transmission of dialing tones during initiation of a telephone call.

19. The method of claim 15, further comprising the step of signaling the digital subscriber line module to transmit an information signal before a ringing tone is transmitted via the telecommunications line.

* * * * *